Patented May 10, 1938

UNITED STATES PATENT OFFICE 2,117,260

SUBSTITUTED P - AMINO - BENZENE - SULPHONAMIDES AND PROCESS OF PRODUCING THEM

Elmer H. Stuart, Indianapolis, Ind., assignor to Eli Lilly and Company, Indianapolis, Ind., a corporation of Indiana No Drawing. Application June 26, 1937, Serial No. 150,545

10 Claims. (Cl. 260—106)

My invention relates to substituted p-aminobenzene-sulphonamides, particularly p-mandelylamino-benzene-sulphonamide and its intermediate p - acetylmandelylamino - benzene - sulphonamide, and to the process of producing them; both in their racemic and in their optically active forms.

This new compound, p-mandelylamino-benzene-sulphonamide, in its racemic form as well as in its d and l forms, on oral administration, has excellent protective and curative properties against various infections, including urinary infections; and its toxicity is low. The intermediate product, p - acetylmandelylamino - benzene-sulphonamide, also has therapeutic properties.

While variants of my method may be used in preparing p-mandelylamino - benzene - sulphonamide, the method I prefer is as follows:

p-Amino-benzene-sulphonamide is treated, in solution or suspension in a non-polar solvent, such for instance as chloroform or benzene, with acetylmandelyl chloride (a method for preparing which is described in Organic Syntheses, volume 4, page 1, published 1925 by John Wiley and Sons, Inc., New York); and the whole is then treated to drive off the solvent. This produces a reaction as follows:

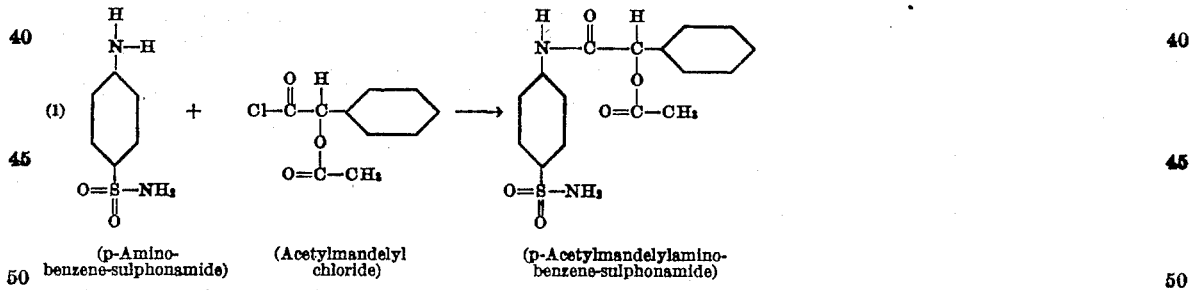

(p-Amino-benzene-sulphonamide)    (Acetylmandelyl chloride)    (p-Acetylmandelylamino-benzene-sulphonamide)

The p-acetylmandelylamino-benzene-sulphonamide is a new product, an intermediate in my present invention although it also has valuable properties in combating infections. When first produced this is a light-tan-colored powder, but on recrystallization from alcohol it is obtained in the form of white crystals, which melt at 187.5–189.5° C., corrected.

In order to obtain my final product, I remove the acetyl group in any suitable manner. To this end, preferably, I boil a slightly acidified aqueous solution of the p-acetylmandelylamino-benzene-sulphonamide for several hours, to remove the acetyl radical. The reaction is apparently as follows:

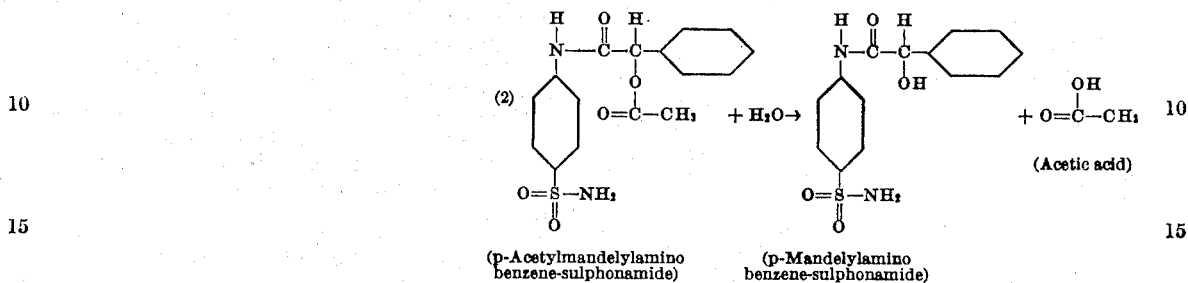

(p-Acetylmandelylamino benzene-sulphonamide)    (p-Mandelylamino benzene-sulphonamide)

The p-mandelylamino - benzene-sulphonamide thus obtained, when recrystallized from alcohol, is a white crystalline solid, which melts at about 232° C. corrected. Assay for sulphur indicates the correctness of the formula given.

Both my intermediate product and my final product, p - acetylmandelylamino - benzene - sulphonamide and p-mandelylamino-benzene-sulphonamide respectively, are sparingly soluble in water, and more soluble in alcohol; the intermediate product being soluble in ethyl alcohol to the extent of about two parts per hundred, and the final product to the extent of slightly less than one part per hundred. Both can be administered orally, most conveniently in tablet form, in the treatment of various infections, and are found to be effective.

The following is an example of the process of manufacturing my new product:

To about 70 grams of p-amino-benzene-sulphonamide are added about 500 cc. of benzene, to form a suspension; and then there is added about 71 grams (about a molecular equivalent or slightly less) of acetylmandelyl chloride. The mixture is boiled on a water bath until about half of the benzene or slightly more than half is evaporated; and then substantially all the remaining benzene is removed by evaporation in vacuo. This leaves a light-tan-colored solid, which is the p-acetylmandelylamino-benzene-sulphonamide, my intermediate product. If desired, this intermediate product may be purified by recrystallization from alcohol; but purification at this stage is not necessary unless it is desired to use this intermediate product as the final product.

To produce the final product, the intermediate product obtained as above, whether or not it has been subjected to recrystallization, has added to it about 1200 cc. of water and about 50 cc. of concentrated (36%) hydrochloric acid. These amounts of water and hydrochloric acid are not critical. The mixture obtained is refluxed for several hours, conveniently about four hours, and then cooled to room temperature. In such refluxing, there is usually at first a considerable foaming, with the particles of solid matter largely in and on the foam; but as the refluxing continues the foam disappears, and the solid particles tend to distribute themselves more or less uniformly through the liquid, which I think is an indication that the reaction has been substantially completed. On cooling, this solid matter tends to settle to the bottom, and may be separated from the liquid by decantation and/or filtration. This solid matter is of a light-tan color as thus first obtained; but on recrystallization from alcohol it is obtained in the form of white crystals.

Whether my intermediate product and my final product are of the racemic (dl) form, or of the levo form or the dextro form, may be controlled as desired by selecting the initial acetylmandelyl chloride of the racemic or of the levo or the dextro form; for the form of my intermediate and final products corresponds to the form of that acetylmandelyl chloride in respect of optical rotation. All these forms of my intermediate product and of my final product are efficacious in the treatment of infections.

I claim as my invention:

1. The substituted p-amino-benzene-sulphonamides, in which a hydrogen atom of the p-amino group is replaced by a radical of the class consisting of the mandelyl and the acetyl-mandelyl groups.

2. The new compound, p-acetylmandelylamino-benzene-sulphonamide, which has the following structural formula:

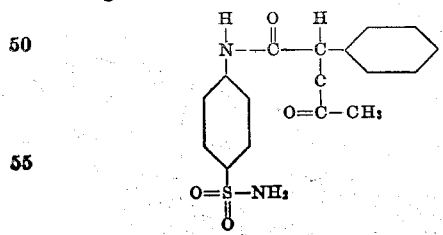

which compound melts at about 187.5–189.5° C., and is sparingly soluble in water and slightly more soluble in alcohol.

3. The new compound, p-mandelylamino-benzene-sulphonamide, which has the following structural formula:

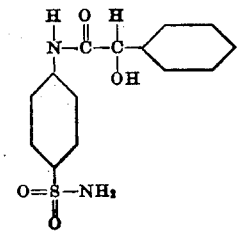

which compound is sparingly soluble in water and slightly more soluble in alcohol.

4. The levo form of the p-mandelylamino-benzene-sulphonamide set forth in claim 3.

5. The dextro form of the p-mandelylamino-benzene-sulphonamide set forth in claim 3.

6. The process of producing p-acetylmandelylamino-benzene-sulphonamide, which consists in causing p-amino-benzene-sulphonamide to react with acetylmandelyl chloride in a non-polar solvent.

7. The process of producing p-mandelylamino-benzene-sulphonamide, which consists in causing p-amino-benzene-sulphonamide to react with acetylmandelyl chloride in a non-polar solvent to produce p-acetylmandelylamino-benzene-sulphonamide, and treating the p-acetylmandelylamino-benzene-sulphonamide to remove the acetyl group therefrom.

8. The process of producing p-mandelylamino-benzene-sulphonamide, which consists in treating p-acetylmandelylamino-benzene-sulphonamide to remove the acetyl group therefrom.

9. The process of producing p-mandelylamino-benzene-sulphonamide, which consists in causing p-amino-benzene-sulphonamide to react with acetylmandelyl chloride in a non-polar solvent to produce p-acetylmandelylamino-benzene-sulphonamide, and boiling the p-acetylmandelylamino-benzene-sulphonamide so obtained in a slightly acidulated aqueous solution to remove the acetyl radical and thus produce the desired p-mandelylamino-benzene-sulphonamide.

10. The process of producing p-mandelylamino-benzene-sulphonamide, which consists in boiling p-acetylmandelylamino-benzene-sulphonamide in a slightly acidulated aqueous solution to remove the acetyl radical and thus produce the desired p-mandelylamino-benzene-sulphonamide.

ELMER H. STUART.